United States Patent [19]

Renskers et al.

[11] 3,735,214

[45] May 22, 1973

[54] A HEADER FOR MOUNTING CIRCUIT ELEMENTS FOR INCORPORATION IN AN ELECTRIC CIRCUIT

[75] Inventors: John O. Renskers; Charles E. Jensen, both of Crystal Lake, Ill.

[73] Assignee: Coilcraft Inc., Cary, Ill.

[22] Filed: Jan. 27, 1972

[21] Appl. No.: 221,364

[52] U.S. Cl..........317/234 R, 317/234 E, 317/234 G, 174/52 PE, 174/DIG. 3, 29/588

[51] Int. Cl...............................H01l 3/00, H01l 5/00

[58] Field of Search...........................317/234, 4, 4.1, 317/5, 5.4, 101 C, 101 CC; 174/DIG. 3; 29/588

[56] References Cited

UNITED STATES PATENTS

| | | | |
|---|---|---|---|
| 2,971,138 | 2/1961 | Meisel et al. | 317/234 |
| 3,280,378 | 10/1966 | Brady et al. | 317/101 C |
| 3,345,541 | 10/1967 | Cobaugh et al. | 317/101 CC |
| 3,492,536 | 1/1970 | Girolamo et al. | 317/235 |
| 3,478,420 | 11/1969 | Grimes et al. | 317/243 |
| 3,605,062 | 9/1971 | Tinkelenberg | 174/DIG. 3 |

*Primary Examiner*—John W. Huckert
*Assistant Examiner*—Andrew J. James
*Attorney*—William F. Gradolph, and Howard H. Rogers, Jr.

[57] ABSTRACT

A miniature component mounting header for those circuit elements which do not lend themselves to printed or to IC fabrication, for connection into hybrid micorcircuits.

11 Claims, 8 Drawing Figures

A HEADER FOR MOUNTING CIRCUIT ELEMENTS FOR INCORPORATION IN AN ELECTRIC CIRCUIT

SUMMARY OF THE INVENTION

With the development of thick film hybrid microcircuits, it has been necessary to make provision for incorporation of elements into those circuits which do not lend themselves to direct incorporation as by printing, layering, or etching techniques, but which must be made the subject of separate attachment to such circuitry. Among these elements notably are inductances of any but the lowest values.

The requisites of a module of this character are that it must be miniature in size, adaptable for mounting to the face of the substrate, and, for consumer electronics, low in cost.

The present device is a header for mounting any of a variety of circuit components or elements into a thick film circuit in the above described fashion which meets these requirements of smallness, capability of attachment to the surface of thick film circuits together with the requisite temperature resistance to permit such attachment, and low cost. The unit employs a novel terminal conductor, namely flattened tinned copper wire, which has notable expense advantages. The lead is attached in novel fashion, lending itself to further cost reduction in the fabrication of the header. The leads, with slight modification, are adapted to connection into printed circuitry. The design of the header lends itself to easy connection of the circuit element leads to the terminals, hence again reducing cost, and to the ultimate accommodation of the connected ends of the terminals to provide strain relief for the connection and a compact encapsulation or enclosure of the circuit element.

DESCRIPTION OF A PREFERRED EMBODIMENT

Figures 1, 2, 3, 4, 5, 6, 7, 8:
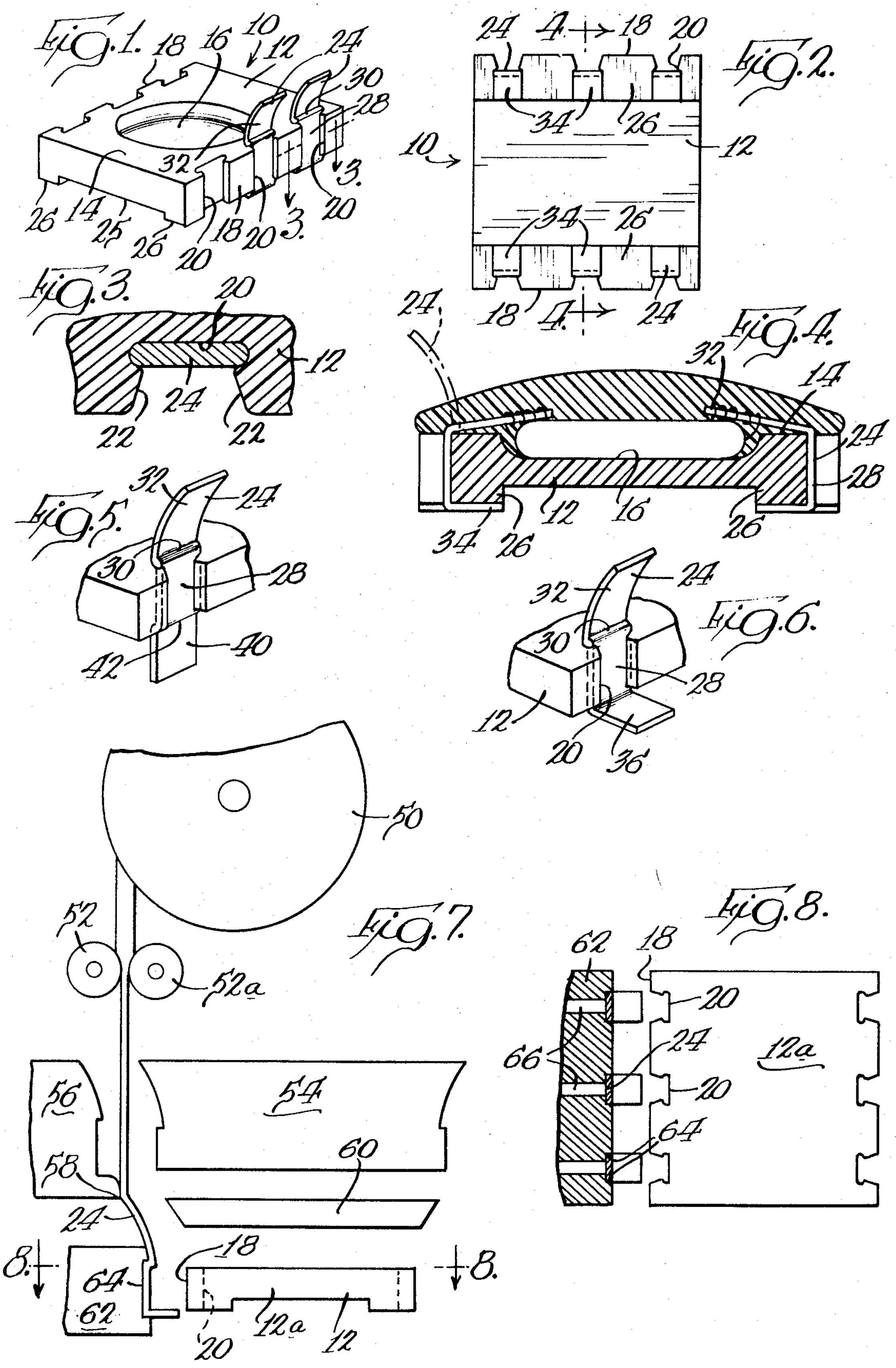
FIG. 1 is a perspective view of a header embodying the present invention, partially furnished with terminals.
FIG. 2 is a bottom plan view of the header of FIG. 1 shown with the full complement of terminals.
FIG. 3 is a fragmentary section taken along the line 3—3 of FIG. 1.
FIG. 4 is a central section which may be regarded as taken on the line 4—4 of FIG. 2 looking in the direction of the arrows of a header complete with circuit element and encapsulant.
FIGS. 5 and 6 are similar fragmentary perspective views of a header illustrating alternative terminal configurations.
FIG. 7 is a somewhat diagrammatic elevation of the mechanism for making and attaching the terminals to the header block.
FIG. 8 is a section taken along the line 8—8 of FIG. 7.

The illustrated header 10 of this invention consists of a generally rectangular plastic body 12 which may be formed of high temperature polymers such as methylpentene or polyphenylene sulfide for certain applications or may be formed of more conventional polymers such as nylon, polyethylene, or polypropylene. On its top surface 14 it may have a depression 16, here shown to be circular to accommodate a coil, but may be of any shape, or indeed, not present at all. On opposite edges 18, three shallow, relatively wide, vertically extending, dovetail grooves 20 are molded. The dovetail edges 22 are rounded to facilitate entry of the terminals 24. On its under side 25, the block 12 has downwardly projecting flat bottom ribs 26 across each of the grooved ends.

The terminals 24 of this invention are flat strips proportioned in width and depth to the dovetail grooves 20. They include a central portion 28 adapted to be contained within the dovetail grooves 20, a small offset 30 at the upper edge of the portion 28 designed to lap over the top edge of the block 12 and an upper connecting end 32 extending upwardly and flared outwardly for the easy attachment of circuit element leads thereto.

The terminal ends 34, by means of which connection is made to the thick film circuit or printed circuit, as the case may be, may take any of several forms depending upon the wishes of the users and the nature of the circuit to which it is to be mounted. A preferred form is that shown in FIG. 1 wherein those terminal ends 34 extending below the block 12 are formed at a right angle to the contained portion 28 to underlie the ribs 26 at spaced intervals. This structure provides pads under the header adapted to be placed in contact with matching conductive areas on a thick film circuit and be secured thereto by a conductive cement or by furnace soldering. This structure has the advantage of limiting the area occupied by the header in a circuit to the confines of the block 12 itself.

Another form of terminal end is shown in FIG. 6. Here the end 36 extends outward from the header at a right angle to the contained portion 28 of the terminal. The terminal is firmly held in the groove, the offset 30 engaging the top edge of the block and the end 36 catching under the dovetail edges. This structure occupies more room on a thick film circuit but lends itself to iron or ultrasonic soldering.

A third form, intended for use in printed circuit applications, is that shown in FIG. 5. Here the terminal ends 40 extend vertically downward below the header block 12. In this configuration it is desirable that there be an offset 42 in the terminal strip below as well as above the terminal block to prevent longitudinal shifting of the terminal strip within the dovetail groove. The terminal end 40 may be formed to have a transverse curvature to improve its stiffness and to reduce the width span of the terminal end for easier entry into printed circuit board holes, but in a specific contemplated embodiment, the terminal ends are short enough and narrow enough to serve the purpose competently without the curvature, as illustrated.

The formation and insertion of the terminal strips is somewhat diagrammatically illustrated in FIGS. 7 and 8. Flat metal ribbon has a number of drawbacks in the context of this invention. It is generally an expensive material. It is available only in relatively short lengths. It must be stored in regular helical rolls without haphazard lay of the turns. It will have ragged and sharp edges due to the slitting operation by which it is formed. It is difficult to tin uniformly.

With these drawbacks in mind, it is a part of this invention that tinned copper wire be employed instead of preformed ribbon material. The copper wire will be flattened to the appropriate width and thickness by a simple rolling as a continuous step in the insertion procedure. In the course of such flattening, the edges of the ribbons so formed will keep the roundness characteristic of the wire, and the tinning will flow uniformly with the copper base of the wire so as to be uniform over the surface thereof.

To this end, therefore, a header block station 12*a* will be established to and from which header blocks will be delivered automatically with the grooved edges oriented in the direction of block movement. The blocks may be molded in continuous strips with interconnecting tongues for delivery to and from the station and for subsequent separation. For each of the illustrated six terminal strips, a roll of copper wire 50 will be provided feeding into a pair of facing rollers 52 which flatten the wire to the desired dimensions. The roll 52*a* which flattens the wire on the side confronting the block 12 may have a knurled surface so as to impart a knurling to the facing surface of the flattened wire.

From the rollers 52, the flattened wire passes downward between the stationary half 54 of shaping dies and the movable half 56 thereof. Although there is shown only the lefthand movable die 56 in FIG. 8, it will be appreciated that the right-hand side of the stationary shaping die will have a movable die identical with movable die 56 moving against it from the opposite direction. The movable die 56 has a bottom shearing edge 58 which cooperates with a retractable shear 60 underlying the stationary die block 54 which separates the formed terminal strip from the infeeding flattened wire. The formed terminal strips prior to shearing separation are carried down into a transfer die 62 which has vertical grooves 64 therein aligned with the dovetail grooves 20 and conform to the outside surface of the terminal strips. The grooves have relatively movable plungers 66 therewithin narrower than the dovetail grooves and movable relative to the transfer die 62.

In operation, with the dies open, a header block 12 will be moved to its station 12*a* and a length of wire will be fed through the rollers 52 into the dies 54 and 56 equal in length to a terminal strip. With an advance of the movable dies 56 and 62, the retractable shear will be moved from a displaced position (out of the plane of FIG. 7) to the illustrated position at the station 12*a*, and a previously formed terminal strip 24 will be engaged in the grooves 64 of the transfer die 62 to be supported thereby. Upon further movement, the strip will be sheared off by the cooperating shearing edges 58 and 60. Upon still further movement, the now detached terminal strip 24 will be carried to the mounting block 12 and at the same time, the portion of the flattened wire immediately above the line of shear will be formed into a terminal strip to be delivered to the next mounting block 12. A final independent movement of the plunger 66 will snap the terminal strip past the edges of the dovetail grooves 20 for final attachment. It will be appreciated that regardless of the configuration of the terminal strips as among the three described, the same general mode of formation and attachment may be practised.

Following formation of the header with the attached terminals, the desired circuit element will be deposited in the depression 16 and cemented therein or not as desired, or the element may be deposited on and cemented directly to the top surface of the block in the absence of a depression 16. The circuit element leads are wrapped or wound on the connection ends 32 of the terminal strips. By virtue of the outward flare of the terminal strips, the lead-terminal strip connections may be solder-dipped without a 180° inversion of the header. The header may thus mount an element that stands higher than the ends 32 of the terminal strips. With a header body of nylon, polypropylene, polyethylene, etc., the heat conduction from the solder-dipping operation will result in a melting of the knurled inside surface of the central portion of the terminal strips into the body material to a slight degree to improve its retention. Following the soldering of the circuit element lead-terminal strip connection, the attachment ends 32 of the terminal strips 24 will be bent inward to overlie the header body as particularly illustrated in FIG. 4, and thereafter a cap or encapsulant may be molded or otherwise attached to the top surface of the header body. The inward bending of the terminal strips, of course, affords a high degree of strain relief to the circuit element lead.

In order to convey a sense of proportion to the invention here, a commercial design embodying the invention has a length of 0.4 inches and a width of 0.35 inches. The standing height of the completed and mounted circuit element of FIG. 5 is 0.1 inches. The wire employed for the terminal strips is 22 gauge wire which rolls out to a width of 0.05 inches and a thickness of 0.01 inches.

The pads 34 (or tabs 36 of FIG. 7) provide generous, flat, well-tinned surfaces for connection to a thick film circuit. As stated above, they may be connected to matching surfaces in the circuit by furnace soldering, in which event a high temperature plastic such as those specified above will be employed or by the use of conductive cements.

The particular advantage of the rolled copper wire as opposed to preformed strip material resides in the rounded edges which the wire will retain in the course of flattening. The plastic material of which the block is formed has a degree of resilience so as to permit the passage of the edges of the strip through the dovetail edges in the grooves. A certain passage of the strips can occur only where a smooth sliding contact is made between the edges of the strips and the dovetail edges. Any sharpness or roughness at the edges of the strip would cause the strip to hang up on the outside of the dovetail points and escape full insertion. A further advantage of the use of the flattened wire lies in the fact that wire is available in almost indefinite lengths; up to 50,000 feet if desired, whereas, purchased ribbon stock formed from sheet material is of limited length and therefore requires frequent machine attendance to replenish the supply.

We claim:

1. A component mounting header comprising a nonrigid block adapted to have a circuit component mounted to the top face thereof and having vertical dovetail grooves formed in and extending across a vertical edge thereof, flat terminal strips having smoothly rounded edges contained between their ends in said grooves to extend above and below said grooves, the entrance to said groove being less than but sufficiently near the width of said strip to be yieldable to the width of said strip, the lower ends of said strips being adapted for circuit connection and the upper ends of said strips being adapted to have component leads secured thereto.

2. The combination of claim 1 wherein said lower ends of said strips are at right angles to said centrally contained portions.

3. The combination of claim 1 wherein said terminal strips have an offset thereacross engaging said top face.

4. The combination of claim 3 wherein said terminal strips include a second offset thereacross engaging the bottom face of said block, said lower ends extending from said offset in a plane parallel to that of said contained portions.

5. The combination of claim 1 wherein said lower ends are bent through a right angle under said block.

6. The combination of claim 2 wherein said lower ends are of uniform cross section with said contained portions.

7. The combination of claim 1 wherein said strips have a substantially uniformly tinned surface.

8. The combination of claim 1 wherein said strips are flattened tinned copper wire.

9. The combination of claim 8 wherein the surface of said strips confronting said block is knurled.

10. Hook-up strip for making electrical connections comprising tinned copper wire uniformly flattened over its length to have flat parallel opposite sides, smoothly rounded edges and a substantially uniformly tinned surface.

11. The combination of claim 10 wherein one of said sides is knurled.

* * * * *